(12) United States Patent
Gabale et al.

(10) Patent No.: US 11,989,772 B2
(45) Date of Patent: May 21, 2024

(54) SYSTEM AND METHOD FOR EXTRACTING PRODUCT INFORMATION FROM LOW RESOLUTION PHOTOS FOR UPDATING PRODUCT MASTER

(71) Applicant: INFILECT TECHNOLOGIES PRIVATE LIMITED, Bengaluru (IN)

(72) Inventors: Vijay Gabale, Bengaluru (IN); Anand Prabhu Subramanian, Bengaluru (IN); Vijaykumar Kannan, Bengaluru (IN)

(73) Assignee: INFILECT TECHNOLOGIES PRIVATE LIMITED, Bengaluru (IN)

( * ) Notice: Subject to any disclaimer, the term of this patent is extended or adjusted under 35 U.S.C. 154(b) by 323 days.

(21) Appl. No.: 17/623,980

(22) PCT Filed: Jul. 5, 2020

(86) PCT No.: PCT/IN2020/050588
§ 371 (c)(1),
(2) Date: Dec. 30, 2021

(87) PCT Pub. No.: WO2021/005621
PCT Pub. Date: Jan. 14, 2021

(65) Prior Publication Data
US 2022/0358571 A1 Nov. 10, 2022

(30) Foreign Application Priority Data
Jul. 5, 2019 (IN) .............................. 201941027078

(51) Int. Cl.
*G06Q 30/0601* (2023.01)
*G06Q 20/20* (2012.01)
(Continued)

(52) U.S. Cl.
CPC ........ *G06Q 30/0643* (2013.01); *G06Q 20/20* (2013.01); *G06V 10/454* (2022.01); *G06V 10/82* (2022.01); *G06V 20/52* (2022.01)

(58) Field of Classification Search
CPC .. G06Q 30/0643; G06Q 20/20; G06V 10/454; G06V 10/82; G06V 20/52; G06F 18/24133; G06T 3/4053
See application file for complete search history.

(56) References Cited

U.S. PATENT DOCUMENTS 10,489,887 B2 * 11/2019 El-Khamy ............. G06N 3/045
2016/0205341 A1 * 7/2016 Hollander .............. H04N 19/46
375/240.08

(Continued)

*Primary Examiner* — Peter Ludwig (57) ABSTRACT

A system for extracting a product information of assets from the low resolution media contents taken in an environment 104 and updating a global product-master database 110 with the extracted product information is provided. An image capturing device 102 captures the media contents of assets. The product information extraction system 106 that (i) receives the media contents from the device 102, (ii) identifies the low resolution media contents based on size and dimensions of media contents, (iii) parses the low resolution media contents, using a system of cascading deep neural networks, to generate the product information at Stock Keeping Unit (SKU) level, (iv) transfers the product information obtained from the deep neural network system to the point of sale device 108 to update a local point-of-sale product-master, and (v) transmits the product information to the a global product-master server to update the global product-master database 110.

16 Claims, 6 Drawing Sheets

(51) Int. Cl.
  *G06V 10/44* (2022.01)
  *G06V 10/82* (2022.01)
  *G06V 20/52* (2022.01)

(56) References Cited

U.S. PATENT DOCUMENTS

2019/0026538 A1* 1/2019 Wang .................... G06V 40/172
2019/0087772 A1* 3/2019 Medina ................. G05D 1/0246
2020/0311871 A1* 10/2020 Yu .............................. G06T 7/10
2023/0040470 A1* 2/2023 Ermans ................. G06F 18/211

* cited by examiner

SYSTEM AND METHOD FOR EXTRACTING PRODUCT INFORMATION FROM LOW RESOLUTION PHOTOS FOR UPDATING PRODUCT MASTER

BACKGROUND

Technical Field

The embodiments herein generally relate to a determination of a product information by analyzing one or more photos of assets in an environment using neural networks, and more particularly to a system and method for automatically extracting a product information at SKU (Stock Keeping Unit) level from low-resolution shelf photos captured in complex retail environments via a system of cascading deep neural networks and automatically updating a local point-of-sale product-master as well as a global product-master database with the extracted product information.

Description of the Related Art

With an emergence of e-commerce, there is an established and growing trend of online cloud based hyperlocal supermarkets to source and order products from offline retail stores. In order to enable such system, it is imperative that the inventory present (in stock) in the offline retail stores be made available as part of a central digital online database, often referred to as a product master or a master inventory database. A few times, the point of sale systems that track inflow and outflow of products to and from the retail stores are not connected to the Internet, and hence the inventory present in the offline stores is not available to be ordered via online channels. Often, the general trade stores use point of sale terminals only to issue purchase bills and have no system in place to keep track of the inflow and outflow of products present on the shelves and in the back-offices. Hence, due to the lack of digitization, the inventory remains invisible from the Internet. At other times, the developing region general stores do not even have any point of sale systems and hence are completely disconnected from the Internet.

Often, the sales force workers or feet on street agents or the retail store owners carry low-end mobile/Android phones that cannot capture high quality photos. The photo size is often less than 1000 by 1000 pixels in width and height or less than 1 MB in size. Moreover, due to non-availability of high speed networks and poor network conditions, even if a high resolution photo is captured by a high-end mobile/Android phones, it either takes unreasonable time (more than 1 second) to upload the photo, or the upload simply fails due to network timeouts. Hence, even if a high-quality photo is captured, due to the limitations on network speed and available network bandwidth, a low resolution photo (photo dimensions of less than 1000 by 1000 in width and height, or photo size of less than 1 MB) needs to be uploaded in order to do real time processing of the photos.

Therefore, a system where either a CPG (consumer packaged goods) merchandiser or a sales force auditor or the retail store owner herself takes pictures of retail shelves in order to make the inventory captured by the photo instantly available with the local point of sale terminal as well as the central product master database is desirable.

In addition to the need of making the retail inventory available online, another most important aspect is image processing for finding and recognizing products and product information at SKU level from low quality pictures of retail shelves. Existing systems use complex algorithms or general image classifier models to extract a text description or label of the products within the image. However, many product attributes and smaller product details remain unseen by existing product recognition systems.

In recent approach, some systems use a deep neural network modeling for determining the product information at SKU level from photos of retail stores. However, these systems could not work in extracting product information efficiently from low quality or low resolution photos (with size less than 1 MB) taken in retail environment.

Accordingly, there remains a need for a system and method for determining the product information at SKU level from low-quality photos of retail stores in effective manner and for making the retail inventory available online.

SUMMARY

In view of the foregoing, an embodiment herein provides a system for automatically extracting one or more of product information of one or more assets from one or more low resolution media contents taken in a complex environment and automatically updating a global product-master database with the extracted product information. The system comprising an image capturing device, a product information extraction system, a point of sale device with an in-built wireless transmitter and a receiver, a local point-of-sale product-master, a global product-master server and a global product-master database. The image capturing device captures one or more media contents of the one or more assets in the environment. The product information extraction system includes a memory that stores a database and a device processor that includes a set of modules and executes a set of instructions. The set of modules comprise (i) a media content receiving module that communicatively connected to the image capturing device and receives the media contents captured with the image capturing device. The media content includes at least one of an image of an asset, a video of an asset, a shelf brand display, a point of sale brand display, a digital advertisement display or an image, a video or a three-dimensional model of at least one of a physical retail store environment, a digital retail store environment, a virtual reality store environment, a social media environment or a web page environment (ii) a database generation module that generates a database of media contents associated with the environment (iii) a resolution determination module that determines the resolution of the media contents and identifies the low resolution media contents. The low resolution media contents are identified based on size and dimensions of the media contents (iv) a parsing module that parses the low resolution media contents identified by the resolution determination module, using a system of cascading deep neural networks, to generate a product information. The deep neural network system includes (a) a first deep neural network model that is configured to receive the low resolution media contents as input and provides super-resolution media contents of the low resolution media contents (b) a second neural network that is configured to receive the super-resolution media contents of the low resolution media contents from the first neural network as input and identifies a product present at a brand-form level by producing one or more bounding boxes and a brand-form level names for each of the boxes (c) a third neural network that is configured to receive one or more cropped media contents of each of the bounding boxes produced at the second neural network as input and produces one or more high resolution pack-shot media contents by improving the resolution of the cropped media contents by at least 2-fold for making the small details of the product visible. The cropped media contents are created by cropping the bounding boxes (d) a fourth neural network that is configured to receive one or more high resolution pack-shots produced at the third neural network as input and classifies the media contents into a finest-level classes of product (v) a communication module that communicates with a point of sale device and transfers the product information obtained from the deep neural network system, through a secure peer-to-peer protocol, to the point of sale terminal, which further updates a local point-of-sale product-master and (vi) a network module that establishes a connection between the product information extraction system and a global product-master server to transmit the extracted product information from the deep neural network system to the server to update a global product-master database.

In some embodiments, the low resolution media contents comprise media size of less than 1 MB or the media dimensions of less than 1000 by 1000 pixels in width and height.

In some embodiments, the super/high resolution media contents comprise media size of greater than 3 MB or the media dimensions of greater than 3000 by 3000 pixels in width and height.

In some embodiments, the product information includes at least one of a brand name, a brand location, a brand form level name, a brand category, a SKU level name, a brand logo, a text, or a brand specific object. In some embodiments, the product information is a product name at SKU level.

In some embodiments, the first neural network is trained with one or more low resolution media contents of assets taken in the environment as input and the corresponding ground truth high resolution asset media contents as output.

In some embodiments, the second neural network is trained with one or more low resolution and high resolution media contents of assets as input and the corresponding ground truth bounding boxes and names for each bounding box as output.

In some embodiments, the third neural network is trained with one or more crop-media contents encapsulating a single SKU as input and the corresponding ground truth high-resolution pack-shot media contents of the same SKU as output.

In some embodiments, the fourth neural network is trained with one or more pack-shot media contents and crop-media contents of different SKUs as input and the corresponding ground-truth class-labels as output.

In some embodiments, the deep neural networks comprising a convolution based encoder and a decoder that are trained to minimize at least one mean square error loss for each of the pixel between the output media content produced by the network, regression loss to detect bounding boxes and multi-class cross-entropy loss to minimize classification loss to classify each bounding boxes of media content.

In some embodiments, the product information obtained using the deep neural network system is transmitted along with a store ID and a timestamp data to the global product-master server.

In another aspect, a processor implemented method of automatically extracting one or more product information of one or more assets from one or more low resolution media contents taken in a complex environment and automatically updating a global product-master database with the extracted product information is provided. The method comprising the steps of: (a) capturing one or more media contents of one or more assets in an environment using an image capturing device. The media content includes at least one of an image of an asset, a video of an asset, a shelf brand display, a point of sale brand display, a digital advertisement display or an image, a video or a three-dimensional model of at least one of a physical retail store environment, a digital retail store environment, a virtual reality store environment, a social media environment or a web page environment (b) receiving the media contents captured by the image capturing device by a product information extraction system (c) generating a database of media contents associated with the environment (d) determining the resolution of the media contents and identifying the low resolution media contents based on size and dimensions of the media content (f) generating a product information by parsing the low resolution media contents, using a system of cascading deep neural networks. The parsing of the low resolution media contents comprising the steps of: (i) inputting the low resolution media contents into a first deep neural network which provides super-resolution media contents of the low resolution media contents. The first neural network is trained with at least one or more low resolution media contents of assets taken in the environment as input and the corresponding ground truth high resolution asset media contents as output; (ii) passing the super-resolution media contents of the low resolution media contents obtained from step (i) into a second neural network which identifies the product present at a brand-form level by producing one or more bounding boxes and a brand-form level names for each of the boxes. The second neural network is trained with one or more low resolution and high resolution media contents of assets as input and the corresponding ground truth bounding boxes and names for each bounding box as output; (iii) cropping each of the bounding boxes to create one or more crop-media contents for one or more bounding boxes produced at step (ii); (iv) inputting one or more crop-media contents of each of the bounding boxes produced at step (iii) into a third neural network which produces one or more high resolution pack-shot media contents by improving the resolution of the crop-media contents by at least 2-fold for make small details of the product visible. The third neural network is trained with one or more crop-media contents encapsulating a single SKU as input and the corresponding ground truth high-resolution pack-shot media content of the same SKU as output; (v) passing the one or more high resolution pack-shots produced at step (iv) into a fourth neural network which classifies the media contents into a finest-level classes of product. The fourth neural network is trained with one or more pack-shot images and crop-images of different SKUs as input and the corresponding ground-truth class-labels as output (g) transferring the product information generated at step (f) from the product information extraction system to a point of sale device over a secure peer-to-peer protocol by communicating with the point of sale terminal. The point of sale device is devised with an in-build transmitter and a receiver for receiving the product information and updating a local point-of-sale product-master and, (h) further transmitting the product information generated at step (f) to a global product-master server by establishing a connection between the product information extraction system and the server to update a global product-master database.

In some embodiments, the low resolution media contents comprise media size of less than 1 MB or the media dimensions of less than 1000 by 1000 pixels in width and height.

In some embodiments, the super/high resolution media contents comprise media size of greater than 3 MB or the media dimensions of greater than 3000 by 3000 pixels in width and height.

In some embodiments, the product information includes at least one of a brand name, a brand location, a brand form level name, a brand category, a SKU level name, a brand logo, a text, or a brand specific object.

In some embodiment, the deep neural networks comprising a convolution based encoder and a decoder that are trained to minimize at least one mean square error loss for each of the pixel between the output media content produced by the network, regression loss to detect bounding boxes and multi-class cross-entropy loss to minimize classification loss to classify each bounding boxes of media content.

In some embodiments, the product information is transmitted along with a store ID and timestamp data to the global product-master server.

The system has advantages of capable of analyzing the low quality images captured with low-end device; obtaining a fine level product information such as SKU level product name, updating the local point of sale device about the products present on the shelves of the retail environment and making the retail inventory available online.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE DRAWINGS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide a system and method for automatically extracting a product information from the low resolution media contents of one or more assets taken in a complex environment and automatically updating a global product-master database with the extracted product information to make the retail inventory available online Referring now to the drawings, and more particularly to FIGS. 1 through 6, where similar reference characters denote corresponding features consistently throughout the figures, preferred embodiments are shown.

Figure 1:
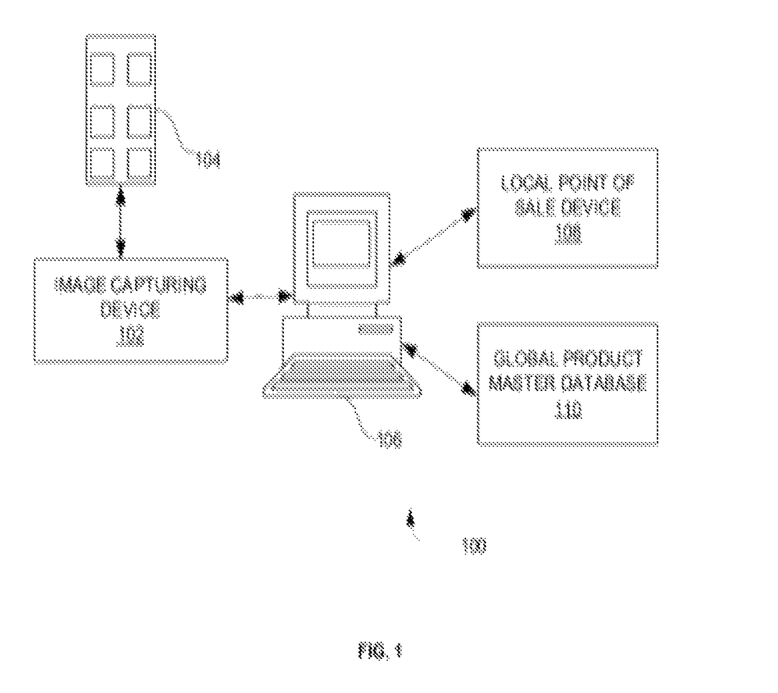
FIG. 1 illustrates a system view of analyzing and determining a product information of one or more assets with an environment according to some embodiments herein.

FIG. 1 illustrates a system view 100 of analyzing and determining a product information of one or more assets with an environment 104 according to some embodiments herein. The system view 100 includes an image capturing device 102, a product information extraction system 106, a point of sale device 108 and a global product master database 110.

In some embodiments, a user may capture the media contents of the environment 104 using the image capturing device 102. The product information extraction system 106 is communicatively connected to the image capturing device 102. The product information extraction system 106 parses low resolution media contents captured using the image capturing device 102 and extracts the product information from the low resolution media contents of assets within the environment 104. The product extraction system 106 is communicatively connected to the point of sale device 108 and the global product master database 110 to transfer the extracted product information to the point of sale device 108 and the global product master database 110.

In some embodiments, the image capturing device 102, without limitation may be selected from a handheld device, a camera, a smartphone, a mobile phone, a virtual reality device or any kind of imaging device. In some embodiments, the product information extraction system 106 without limitation may be selected from a handheld device, a mobile phone, a kindle, a PDA (Personal Digital Assistant), a tablet, a music player, a computer, an electronic notebook or a smartphone.

In some embodiments, the image capturing and the product information extraction can be performed by a same device. In some embodiments, the image capturing device 102 is communicated with the product information extraction system 106 via a cloud server to obtain the extracted product information from the product information system 106 and updates the extracted product information with the global product master database 110.

The product information extraction system 106 includes a memory and a device processor. The image capturing device 102 captures the media contents from the environment 104. The product information extraction system 106 receives the media contents captured by the image capturing device 102. In some embodiments, the media content includes at least one image of an asset, a video of an asset, a shelf brand display, a point of sale brand display, a digital advertisement displays or an image, a video or a three-dimensional model of at least one of a physical retail store environment, a digital retail store environment, a virtual reality store environment, a social media environment or a web page environment.

The product information extraction system 106 generates a database of media contents associated with the environment 104. The product information extraction system 106 determines a resolution of the media contents associated with the environment 104 and identifies the low resolution media contents and high resolution media contents based on a size and dimensions of the media content using an image processing technique. In some embodiments, the product information extraction system 106 determines the media contents with a size of less than 1 MB or the dimensions of less than 1000 by 1000 pixels in width and height as low resolution media contents and the media contents with a size of greater than 3 MB or the dimensions of greater than 3000 by 3000 pixels in width and height as high resolution media contents. In some embodiments, the media content is an image of the asset.

In some embodiments, the media content includes a video of an asset or a video of at least one of the physical retail store environments, the digital retail store environment, the virtual reality store environment, the social media environment or the web page environment is parsed to extract one or more images.

In some embodiments, the media content is converted into a three-dimensional model, when the media content is received from the digital retail store environment or the virtual reality store environment.

The product information extraction system 106 includes a system of cascading deep neural networking models to determine at least one product information by parsing the low resolution media contents (size of less than 1 MB) associated with each of the one or more assets in the environment 104. The product information may include at least one of a brand name, a brand location, a brand form level name, a brand category, a SKU level name, a brand logo, a text, or a brand specific object.

In some embodiments, the system of cascading deep neural networking models of the product information extraction system 106 include a first neural network, a second neural network, a third neural network and a fourth neural network to determine product information at the SKU level from the low resolution media contents by parsing the media contents. The first deep neural network receives the low resolution media contents as input and provides super-resolution media contents of the low resolution media contents. The second neural network receives the super-resolution media contents of the low resolution media contents from the first neural network and identifies a product present at a brand-form level by producing one or more bounding boxes and a brand-form level names for each of the boxes from the super resolution media contents.

The third neural network receives one or more crop-media contents of each of the bounding boxes produced at the second neural network as input and produces one or more high resolution pack-shot media contents by improving the resolution of the crop media contents. The crop media contents are created by cropping each of the bounding boxes generated at second neural network. In some embodiments, the resolution of crop media contents is improved by at least 2-fold to produce one or more high resolution pack-shot media contents for making the small details of the product visible. The fourth neural network receives the one or more high resolution pack-shots produced at the third neural network as input and classifies the media contents into a finest-level classes of product.

In some embodiments, the neural networking model is a machine learning technique that is designed to recognize and interpret the data through a machine perception, a labeling and by clustering raw data. The neural networking models are trained to interpret the raw data by providing a collection of data as an input. The neural networking model is trained to perform the task with the processor.

The first neural network is trained with the one or more low resolution media contents of assets taken in the environment 104 as input and the corresponding ground truth high resolution media contents of assets as output. The second neural network is trained with one or more low resolution and high resolution media contents of assets as input and the corresponding ground truth bounding boxes and names for each bounding box as output. The third neural network is trained with one or more crop-media contents encapsulating a single SKU as input and the corresponding ground truth high-resolution pack-shot media contents of the same SKU as output. The fourth neural network is trained with one or more pack-shot media contents and crop-media contents of different SKUs as input and the corresponding ground-truth class-labels as output.

In some embodiments, the product information extraction system 106 transmits a store ID and timestamp data along with the product information extracted using the system of cascading of neural networks to the global product-master database 110.

Figure 2:
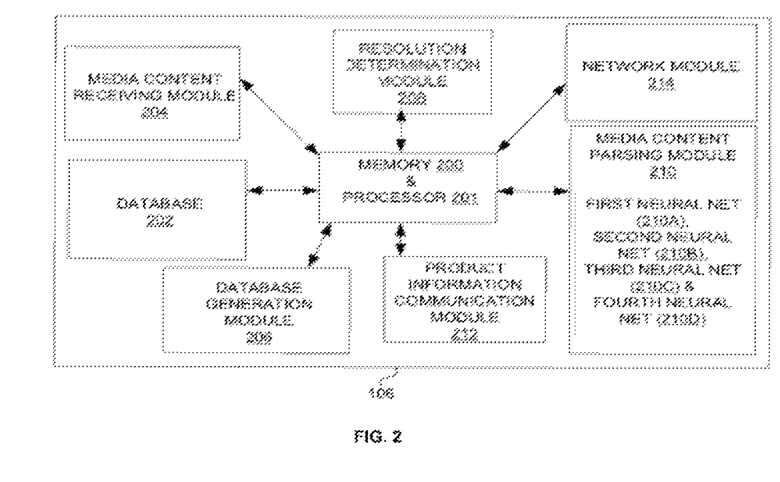
FIG. 2 is an exploded view of a product information extraction system of FIG. 1 according to some embodiments herein.

FIG. 2 is an exploded view of the product information extraction system 106 of FIG. 1 according to some embodiments herein. The product information extraction system 106 includes a memory 200 that stores a database 202 and a device processor 201 that includes a set of modules and executes a set of instructions. The processor 201 includes media contents receiving module 204, a database generating module 206, a resolution determining module 208, a parsing module 210, a product information communication module 212 and a network module 214.

The product information extraction system 106 receives, by the receiving module 204, the media contents captured by the image capturing device 102, to analyze and determine a product information of one or more assets in the environment 104 within the media contents. The database generation module 206 generates the database 202 with the media contents associated with the environment 104.

In some embodiments, the image capturing device 102, without limitation may be selected from a handheld device, a camera, a smartphone, a mobile phone, a virtual reality device or any kind of imaging device. In some embodiments, the product information extraction system 106 without limitation may be selected from a handheld device, a mobile phone, a kindle, a PDA (Personal Digital Assistant), a tablet, a music player, a computer, an electronic notebook or a smartphone. In some embodiments, the image capturing and the product information extraction can be done by a same device.

In some embodiments, the media content may include at least one of an image of an asset, a video of an asset, a shelf brand display, a point of sale brand display, a digital advertisement displays or an image, a video or a three-dimensional model of at least one of a physical retail store environment, a digital retail store environment, a virtual reality store environment, a social media environment or a web page environment.

The resolution determination module 208 determines a resolution of the media contents associated with the environment and identifies the low resolution media contents and high resolution media contents based on a size and dimensions of the media content using an image processing technique. In some embodiments, the resolution determination module 208 determines the media contents with a size of less than 1 MB or the dimensions of less than 1000 by 1000 pixels in width and height as low resolution media contents and the media contents with a size of greater than 3 MB or the dimensions of greater than 3000 by 3000 pixels in width and height as high resolution media contents. In some embodiments, the media content is an image of the asset.

In some embodiments, the media content comprising the video of the asset or the video of at least one of the physical retail store environments, the digital retail store environment, the virtual reality store environment, the social media environment or the web page environment is parsed to extract one or more images.

The parsing module 210 parses the low resolution media contents (size of less than 1 MB) associated with each of one or more assets in the environment to determine the product information from the low resolution media contents. The parsing module comprises a system of cascading deep neural networks, to parse the low resolution media contents and to generate the product information from the media contents. In some embodiments, the product information may include at least one of a brand name, a brand location, a brand form level name, a brand category, a SKU level name, a brand logo, a text, or a brand specific object.

In some embodiments, the system of cascading deep neural networks of the parsing module 210 includes a first neural network model 210B, a second neural network model 210B, a third neural network model 210C and a fourth neural network model 210D to determine the product information at SKU level from the low resolution media contents by parsing the media contents. The first deep neural network model 210A receives the low resolution media contents as input and provides super-resolution media contents of the low resolution media contents. The first neural network model 210A is trained with one or more low resolution media contents of assets taken in the environment as input and the corresponding ground truth high resolution media contents of assets as output.

In some embodiments, the first deep neural network 210A includes a convolution based encoder and a decoder networks that is trained to minimize mean square error loss for each of the pixel between the output media content produced by the network 210A during training and the ground truth high resolution media content provided as the true output media content.

The second neural network 210B receives the super-resolution media contents of the low resolution media contents from the first neural network 210A as input and identifies a product present at a brand-form level by producing one or more bounding boxes and a brand-form level names for each of the boxes from the super resolution media contents. The second neural network 210B is trained with one or more media contents of assets as input and the corresponding ground truth bounding boxes and names for each bounding box as output. In some embodiments, the training data for the second neural network 210B includes both the low resolution and the high resolution media contents of the assets to make the deep neural network 210B robust to the complex environmental conditions such as lighting changes, product scatter, and variable sizes of products.

In some embodiments, the second neural network 210B includes a convolution-based encoder and a decoder that is trained to minimize regression loss to detect bounding boxes as well as multi-class cross-entropy loss to minimize classification loss to classify each bounding box.

The third neural network 210C receives one or more cropped-media contents of each of the bounding boxes produced at the second neural network 210B as input and produces one or more high resolution pack-shot media contents by improving the resolution of the crop media contents. In some embodiments, the resolution of crop media contents is improved by at least 2-fold to produce one or more high resolution pack-shot media contents for making the small details of the product visible. For example, a retail product, a shampoo bottle has grammage and weightage mentioned as part of the product design or merchandizing design in a relatively small text, and it becomes to visually identify the exact grammage or weightage amount (e.g., 200 ml vs 100 ml vs 50 ml of a shampoo bottle) unless the specific part of the media content is enlarged and zoomed-in without degrading the quality. The third neural network 210c statistically enlarges the input cropped-media contents in order to make small details visible as part of the enlarged cropped-media content.

In some embodiments, the cropped-media contents are produced by cropping each of the bounding boxes produced at the second neural network 210B to create N number of media contents for N number of bounding boxes, each corresponding to the individual bounding box region taken from the output media contents of the first neural network 210A. The third neural network 210C is trained with one or more crop-media contents encapsulating a single SKU as input and the corresponding ground truth high-resolution pack-shot media contents of the same SKU as output.

In some embodiments, the third neural network 210C comprising a convolution based encoder and a decoder that is trained to minimize mean square error loss for each of the pixel between the output media content produced by the network 210C during training and the ground truth high resolution media content provided as the true output media content.

The fourth neural network 210D receives one or more high resolution pack-shots produced at the third neural network 210C as input and classifies the pack shot media contents into a finest-level classes/patterns of the product. In some embodiments, the finest-level classes of product are product name at SKU level. The fourth neural network 210D determines the SKUs of the corresponding product. For example, Pantene is a brand, and Pantene-bottle is a brand-form, and Pantene-Bottle-Anti-Dandruff-200 ml is the finest level of one of the SKUs.

The fourth neural network 210D is trained with one or more pack-shot media contents and crop-media contents of different SKUs as input and the corresponding ground-truth class-labels as output.

The communication module 212 communicates with a point of sale device 108 via a Bluetooth or Wi-Fi and transfers the product information obtained from the deep neural network system, over a secure peer-to-peer protocol, to the point of sale device 108, which further updates a local point-of-sale product-master. Thus, the point of sale device 108 obtains the information about the products present on the shelves or assets of the retail environment.

The network module 214 establishes a connection between the product information extraction system 106 and a global product-master server to transmit the extracted product information to the server to update a global product-master database 110.

In some embodiments, the network module 214 uses the Internet connection (2G/3G/4G/5G) network to transmit the product information to the global product master server. In some embodiments, the network module 214 further transmits a store ID and timestamp data along with the product information to the global product-master server.

In some embodiments, the image capturing device 102 is communicated with the product information extraction system 106 via a cloud server to obtain the extracted product information from the product information system 106 to update the global product master database 110.

Figure 3:
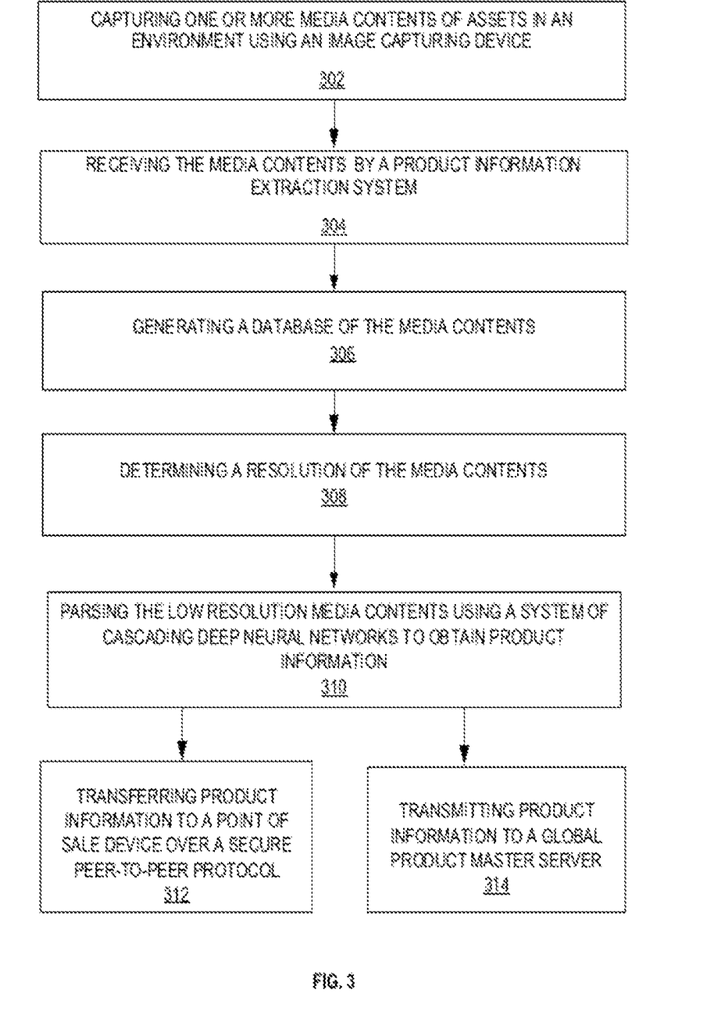
FIG. 3 is a flow diagram that illustrates a method of determining a product information from low resolution media contents of one or more assets in an environment and updating a global product master database with the product information using a product information extraction system of FIG. 1 according to some embodiments herein.

FIG. 3 is a flow diagram that illustrates a method of determining a product information from low resolution media contents of one or more assets in the environment 104 and updating the global product master database 110 with the product information using the product information extraction system 106 of FIG. 1 according to some embodiments herein. At step 302, one or more media contents of one or more assets in the environment 104 is captured using the image capturing device 102. At step 304, the media contents are received from the image capturing device 102 using the product information extraction system 106. At step 306, a database of the media contents associated with the environment 104 is generated. At step 308, a resolution of the media contents is determined and the low resolution media contents are identified based on size and dimensions of the media contents. At step 310, the product information is generated by parsing the low resolution media contents using a system of cascading deep neural networks. At step 312, the product information is transferred to the point of sale device 108 through a secure peer-to-peer protocol for updating a local point-of-sale product-master. At step 314, the product information is transmitted to a global product-master server for updating the global product-master database 110.

Figure 4:
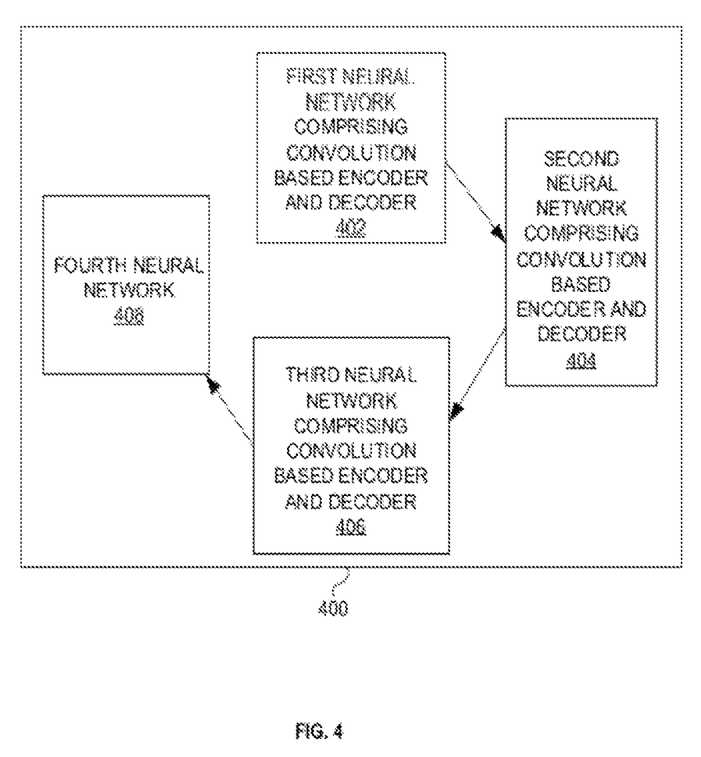
FIG. 4 is a block diagram that illustrates a system of cascading deep neural networks according to some embodiments herein.

FIG. 4 is a block diagram that illustrates a system of cascading deep neural networks according to some embodiments herein. The deep neural network system 400 includes a first neural network model 402, a second neural network model 404, a third neural network model 406 and a fourth neural network model 410. The deep neural network system 400 is configured to parse the low resolution media contents for obtaining the product information from the media contents. In some embodiments, the deep neural networks 402, 404, 406 comprising a convolution based encoder and a decoder that are trained to minimize at least one mean square error loss for each of the pixel between the output media content produced by the network, regression loss to detect bounding boxes and multi-class cross-entropy loss to minimize classification loss to classify each bounding box.

In some embodiments, the media content is captured by a handheld mobile device and the same device either runs the four step algorithms of deep neural networking system locally or send the information to the cloud and obtains the extracted information.

Figure 5:
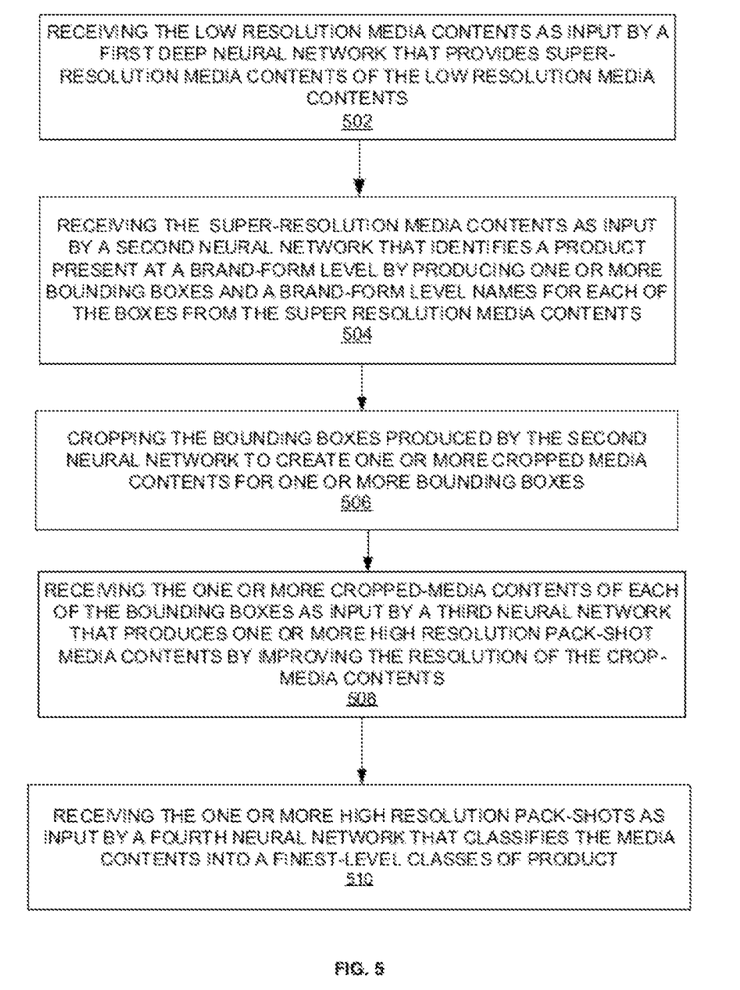
FIG. 5 is a flow diagram that illustrates a method of extracting the product information from the low resolution media contents using a system of cascading neural network models according to some embodiments herein.

FIG. 5 is a flow diagram that illustrates a method of extracting the product information from the low resolution media contents using a system of cascading neural network models according to some embodiments herein. At step 502, a first deep neural network 402 receives the low resolution media contents as input and provides super-resolution media contents of the low resolution media contents. At step 504, a second neural network 404 receives the super-resolution media contents of the low resolution media contents from the first neural network 402 as input and identifies a product present at a brand-form level by producing one or more bounding boxes and a brand-form level names for each of the boxes from the super resolution media contents. At step 506, the bounding boxes produced by the second neural network 404 are cropped to create one or more cropped media contents for one or more of bounding boxes. At step 508, a third neural network 406 receives the cropped-media contents of each of the bounding boxes produced at step 506 as input and produces one or more high resolution pack-shot media contents by improving the resolution of the crop-media contents by at least 2-fold. At step 510, a fourth neural network 408 receives one or more high resolution pack-shots produced at the third neural network 406 as input and classifies the media contents into a finest-level classes of product. In some embodiments, the finest level class of product is a product name at SKU level.

In some embodiments, the low resolution media contents comprise a size of less than 1 MB or the dimensions of less than 1000 by 1000 pixels in width and height. In some embodiments, the high resolution media contents comprise a size of greater than 3 MB or the dimensions of greater than 3000 by 3000 pixels in width and height.

In some embodiments, the media content is an image of the asset. In some embodiments, the media content comprising the video of the asset or the video of at least one of the physical retail store environments, the digital retail store environment, the virtual reality store environment, the social media environment or the web page environment is parsed to extract one or more images.

In some embodiments, the product information may include at least one of a brand name, a brand location, a brand form level name, a brand category, a SKU level name, a brand logo, a text, or a brand specific object.

In some embodiments, the first neural network 402 is trained with one or more low resolution media contents of assets taken in the environment 104 as input and the corresponding ground truth high resolution media contents of assets as output. The second neural network 404 is trained with one or more of low resolution and high resolution media contents of assets as input and the corresponding ground truth bounding boxes and names for each bounding box as output. The third neural network 406 is trained with one or more crop-media contents encapsulating a single SKU as input and the corresponding ground truth high-resolution pack-shot media contents of the same SKU as output. The fourth neural network 408 is trained with one or more pack-shot media contents as well as crop-media contents of different SKUs as input and the corresponding ground-truth class-labels as output.

Figure 6:
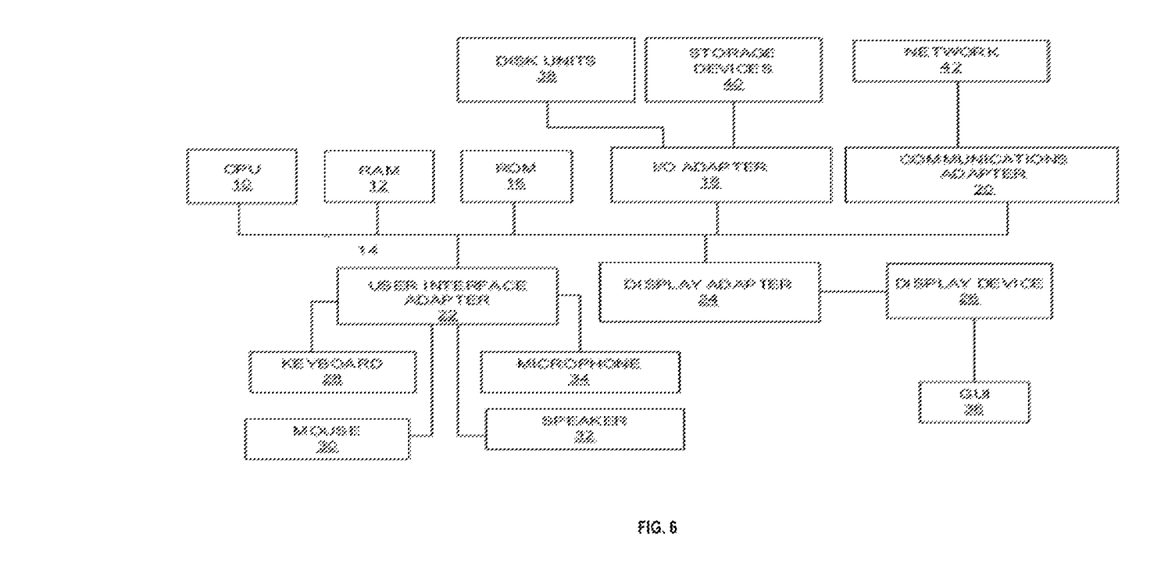
FIG. 6 is a schematic diagram of a computer architecture in accordance with the embodiments herein.

A representative hardware environment for practicing the embodiments herein is depicted in FIG. 6, with reference to FIGS. 1 through 5. This schematic drawing illustrates a hardware configuration of a server/computer system/computing device in accordance with the embodiments herein. The system includes at least one processing device CPU 10 that may be interconnected via system bus 14 to various devices such as a random access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI)

36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

We claim:

1. A system for automatically extracting a plurality of product information of a plurality of assets from a plurality of low resolution media contents taken in a complex environment (104) and automatically updating a global product-master database (110) with the extracted product information, the system comprising:
   an image capturing device (102) that captures a plurality of media contents of the plurality of assets in the environment (104);
   a product information extraction system (106) that extracts the product information from the plurality of media contents;
   a point of sale device (108) that comprises an in-built wireless transmitter and a receiver for updating a local point-of-sale product-master; and
   the global product-master database (110) that is communicated with a global product-master server to obtain updated product information, wherein the product information extraction system (106) comprises:
      a memory (200) that stores a database (202) and a set of instructions; and
      a device processor (201) that executes the set of instructions and is configured to:
         receive the media contents captured by the image capturing device (102), wherein the media contents comprise at least one of an image of an asset, a video of an asset, a shelf brand display, a point of sale brand display, a digital advertisement display or an image, a video or a three-dimensional model of at least one of a physical retail store environment, a digital retail store environment, a virtual reality store environment, a social media environment or a web page environment;
         generate a database (202) of media contents associated with the environment (104);
         determine the resolution of the media contents and identify the low resolution media contents, wherein the low resolution media contents are identified based on size and dimensions of the media contents;
         parse the low resolution media contents, using a system of cascading deep neural networks to generate a product information, wherein the deep neural network system comprises:
            (a) a first deep neural network that is configured to receive the low resolution media contents as input and provide super-resolution media contents of the low resolution media contents;
            (b) a second neural network that is configured to receive the super-resolution media contents of the low resolution media contents from the first neural network and identifies a product present at a brand-form level by generating a plurality of bounding boxes and a brand-form level names for each of the boxes;
            (c) a third neural network that is configured to receive a plurality of crop media contents of each of the bounding boxes produced at the second neural network as input and produces a plurality of high resolution pack-shot media contents by improving the resolution of the crop media contents, wherein the crop media contents are created by cropping each of the bounding boxes generated at second neural network; and
            (d) a fourth neural network that is configured to receive the plurality of high resolution pack-shots produced at the third neural network as input and classifies the media contents into finest-level classes of product;
         communicate with a point of sale device (108) and transfer the product information obtained from the deep neural network system, over a secure peer-to-peer protocol, to the point of sale terminal, which further updates a local point-of-sale product-master; and
         establish a connection between the product information extraction system (106) and a global product-master server to transmit the extracted product information to the server to update a global product-master database (110).

2. The system as claimed in claim 1, wherein the low resolution media contents comprise media size of less than 1 MB or the dimensions of less than 1000 by 1000 pixels in width and height.

3. The system as claimed in claim 1, wherein the super resolution media contents comprise media size of greater than 3 MB or the dimensions of greater than 3000 by 3000 pixels in width and height.

4. The system as claimed in claim 1, wherein the product information comprises at least one of a brand name, a brand location, a brand form level name, a brand category, a Stock Keeping Unit (SKU) level name, a brand logo, a text, or a brand specific object.

5. The system as claimed in claim 1, wherein the first neural network is trained with plurality of low resolution media contents of the one or more assets captured in the environment as input and the corresponding ground truth high resolution media contents of assets as output.

6. The system as claimed in claim 1, wherein the second neural network is trained with plurality of low resolution and high resolution media contents of the one or more assets as input and the corresponding ground truth bounding boxes and names for each bounding box as output.

7. The system as claimed in claim 1, wherein the third neural network is trained with a plurality of crop-media contents encapsulating a single SKU as input and the corresponding ground truth high-resolution pack-shot media contents of the same SKU as output.

8. The system as claimed in claim 1, wherein the fourth neural network is trained with a plurality of pack-shot images and crop-images of different SKUs as input and the corresponding ground-truth class-labels as output.

9. The system as claimed in claim 1, wherein the deep neural networks comprising a convolution based encoder and a decoder that are trained to minimize at least one mean square error loss for each of the pixel between the output media content produced by the network, a regression loss to detect bounding boxes and multi-class cross-entropy loss to minimize a classification loss to classify each bounding box.

10. The system as claimed in claim 1, wherein the processor further transmits a store ID and a timestamp data along with the product information to the global product-master server.

11. A processor-implemented method of automatically extracting a plurality of product information of a plurality of assets from a plurality of low resolution media contents taken in a complex environment (104) and automatically updating a global product-master database (110) with the extracted product information, wherein the method comprising the steps of:

capturing a plurality of media contents of a plurality of assets in an environment using an image capturing device (102), wherein the media contents comprise at least one of an image of an asset, a video of an asset, a shelf brand display, a point of sale brand display, a digital advertisement display or an image, a video or a three-dimensional model of at least one of a physical retail store environment, a digital retail store environment, a virtual reality store environment, a social media environment or a web page environment;

receiving the media contents captured by the image capturing device (102) by a product information extraction system (106);

generating a database (202) of media contents associated with the environment (104);

determining the resolution of the media contents and identifying the low resolution media contents based on size and dimensions of the media content;

generating a product information by parsing the low resolution media contents using a system of cascading deep neural networks, wherein the parsing of the low resolution media contents comprising the steps of:

(i) inputting the low resolution media contents into a first deep neural network that provides a super-resolution media contents of the low resolution media contents, wherein the first neural network is trained with plurality of low resolution media contents of the one or more assets captured in the environment as input and the corresponding ground truth high resolution asset media contents as output;

(ii) passing the super-resolution media contents of the low resolution media contents obtained from step (i) into a second neural network which identifies the product present at a brand-form level by generating a plurality of bounding boxes and a brand-form level names for each of the boxes, wherein the second neural network is trained with plurality of low resolution and high resolution media contents of the one or more assets as input and the corresponding ground truth bounding boxes and names for each bounding box as output;

(iii) cropping each of the bounding boxes to create a plurality of crop-media contents for plurality of bounding boxes produced at step (ii);

(iv) inputting a plurality of crop-media contents of each of the bounding boxes produced at step (iii) into a third neural network which produces a plurality of high resolution pack-shot media contents by improving the resolution of the crop images, wherein the third neural network is trained with a plurality of crop-media contents encapsulating a single SKU as input and the corresponding ground truth high-resolution pack-shot media content of the same SKU as output; and         (v) passing the plurality of high resolution pack-shots produced at step (iv) into a fourth neural network which classifies the media contents into a finest-level classes of product, wherein the fourth neural network is trained with a plurality of pack-shot images and crop-images of different SKUs as input and the corresponding ground-truth class-labels as output;

transferring the product information obtained from the deep neural network system of the product information extraction system (106) to a point of sale device (108) over a secure peer-to-peer protocol by communicating with the point of sale device (108), wherein the point of sale device (108) is devised with an in-build transmitter and a receiver for receiving and updating a local point-of-sale product-master; and     further transmitting the product information to a global product-master server by establishing a connection between the product information extraction system (106) and the server to update a global product-master database (110).

12. The processor implemented method as claimed in claim 11, wherein the low resolution media contents comprise media size of less than 1 MB or the dimensions of less than 1000 by 1000 pixels in width and height.

13. The processor implemented method as claimed in claim 11, wherein the super resolution media contents comprise media size of greater than 3 MB or the dimensions of greater than 3000 by 3000 pixels in width and height.

14. The processor implemented method as claimed in claim 11, wherein the product information comprises at least one of a brand name, a brand location, a brand form level name, a brand category, a Stock Keeping Unit (SKU) level name, a brand logo, a text, or a brand specific object.

15. The processor implemented method as claimed in claim 11, wherein the deep neural networks comprising a convolution based encoder and a decoder that are trained to minimize at least one mean square error loss for each of the pixel between the output media content produced by the network, regression loss to detect bounding boxes and multi-class cross-entropy loss to minimize classification loss to classify each bounding box.

16. The processor implemented method as claimed in claim 11, further comprising a step of transmitting a store ID and a timestamp data along with the product information to the global product-master server.

\* \* \* \* \*